United States Patent
Andrews

(10) Patent No.: US 10,270,831 B2
(45) Date of Patent: Apr. 23, 2019

(54) AUTOMATED SYSTEM FOR COMBINING AND PUBLISHING NETWORK-BASED AUDIO PROGRAMMING

(75) Inventor: Christopher C. Andrews, Los Altos, CA (US)

(73) Assignee: SOUNDLINK, INC., Los Altos, CA (US)

(*) Notice: Subject to any disclaimer, the term of this patent is extended or adjusted under 35 U.S.C. 154(b) by 320 days.

(21) Appl. No.: 13/435,046

(22) Filed: Mar. 30, 2012

(65) Prior Publication Data

US 2012/0254753 A1 Oct. 4, 2012

Related U.S. Application Data

(60) Provisional application No. 61/471,541, filed on Apr. 4, 2011, provisional application No. 61/471,548, filed (Continued)

(51) Int. Cl.
| | |
|---|---|
| *G06F 17/30* | (2006.01) |
| *G06F 3/0484* | (2013.01) |
| *H04N 21/472* | (2011.01) |
| *H04L 29/06* | (2006.01) |
| *H04W 4/021* | (2018.01) |
| *H04W 4/02* | (2018.01) |

(Continued)

(52) U.S. Cl.
CPC ............ *H04L 65/602* (2013.01); *G06F 3/165* (2013.01); *G06F 17/30038* (2013.01); *G06F 17/30772* (2013.01); *G06F 17/30778* (2013.01); *G06F 17/30887* (2013.01); *G10L 15/26* (2013.01); *H04N 21/472* (2013.01); *H04W 4/02* (2013.01); *H04W 4/021* (2013.01); *G06F 3/04847* (2013.01); *H04N 21/432* (2013.01)

(58) Field of Classification Search
CPC .......... G06F 3/04847; G06F 17/30038; G06F 17/30772; H04N 21/472
USPC .......................................... 715/716
See application file for complete search history.

(56) References Cited

U.S. PATENT DOCUMENTS

| | | | |
|---|---|---|---|
| 5,767,845 A | 6/1998 | Oashi et al. | |
| 6,246,672 B1 * | 6/2001 | Lumelsky | H04L 29/06 370/310 |

(Continued)

OTHER PUBLICATIONS

"Grace Digital Audio User Guide GDI-IR1000"—Sirius Retail, May 2010 http://www.siriusretail.com/product/Product_Families/SIRIUS/tab_inc/pdf/GDI-IR1000_UserGuide.pdf.

(Continued)

*Primary Examiner* — Eric J. Bycer
(74) *Attorney, Agent, or Firm* — Haverstock & Owens LLP

(57) ABSTRACT

An audio combining system including a storage database, one or more audio sources and a computing device coupled together via a network. The computing device comprises a processor and an application executed by the processor configured to import audio data comprising a plurality of audio files and metadata describing the audio files from the one or more audio sources, associate the audio files into a plurality of groups based on one or more characteristics of the audio files, transmit the audio data to a storage database and storing the audio data on the storage database and present the plurality of groups to a user for selection, wherein upon selection the audio files comprising the selected group are played in a set order to the user.

50 Claims, 2 Drawing Sheets

Related U.S. Application Data on Apr. 4, 2011, provisional application No. 61/471,552, filed on Apr. 4, 2011, provisional application No. 61/582,164, filed on Dec. 30, 2011, provisional application No. 61/488,954, filed on May 23, 2011.

(51) Int. Cl.
  *G06F 3/16* (2006.01)
  *G10L 15/26* (2006.01)
  *H04N 21/432* (2011.01)

(56) References Cited

U.S. PATENT DOCUMENTS

| | | |
|---|---|---|
| 6,526,411 B1* | 2/2003 | Ward |
| 6,662,231 B1* | 12/2003 | Drosset ............ G06F 17/30017 707/E17.009 |
| 6,748,395 B1* | 6/2004 | Picker et al. |
| 6,909,999 B2 | 6/2005 | Thomas et al. |
| 7,349,923 B2 | 3/2008 | Spring et al. |
| 7,680,288 B2 | 3/2010 | Melchior et al. |
| 7,752,202 B2 | 7/2010 | Kabori et al. |
| 7,783,979 B1 | 8/2010 | Leblang |
| 7,870,197 B2 | 1/2011 | Lewis et al. |
| 8,239,899 B2 | 8/2012 | Hagg |
| 8,402,357 B1 | 3/2013 | Norwood et al. |
| 8,452,887 B1 | 5/2013 | Stier |
| 8,589,169 B2 | 11/2013 | Bradley et al. |
| 8,606,383 B2 | 12/2013 | Jung et al. |
| 8,639,214 B1 | 1/2014 | Fujisaki |
| 8,805,330 B1 | 8/2014 | Horton |
| 8,845,337 B1 | 9/2014 | Hu et al. |
| 2001/0023450 A1 | 9/2001 | Chu |
| 2002/0053078 A1 | 5/2002 | Holtz et al. |
| 2002/0099552 A1 | 6/2002 | Rubin et al. |
| 2002/0091762 A1 | 7/2002 | Sohn et al. |
| 2002/0107884 A1 | 8/2002 | Banerjee et al. |
| 2002/0138630 A1 | 9/2002 | Solomon |
| 2002/0147728 A1* | 10/2002 | Goodman et al. ......... 707/104.1 |
| 2003/0030659 A1 | 2/2003 | Wu |
| 2003/0069893 A1 | 4/2003 | Kanai et al. |
| 2003/0135857 A1* | 7/2003 | Pendakur et al. .............. 725/61 |
| 2003/0149802 A1 | 8/2003 | Curry |
| 2003/0188263 A1 | 10/2003 | Bates |
| 2004/0010508 A1 | 1/2004 | Fest |
| 2004/0034536 A1* | 2/2004 | Hughes .................. H04H 60/46 704/278 |
| 2004/0148353 A1 | 7/2004 | Karaoguz et al. |
| 2004/0181413 A1 | 9/2004 | Lui et al. |
| 2004/0254659 A1* | 12/2004 | Bolas ............... G06F 17/30017 700/94 |
| 2005/0038819 A1* | 2/2005 | Hicken et al. ............. 707/104.1 |
| 2005/0038826 A1 | 2/2005 | Bae et al. |
| 2005/0234983 A1* | 10/2005 | Plastina et al. ............ 707/104.1 |
| 2005/0240494 A1* | 10/2005 | Cue ...................... G06Q 10/107 705/26.1 |
| 2006/0008256 A1* | 1/2006 | Khedouri .......... G06F 17/30038 386/234 |
| 2006/0053364 A1 | 3/2006 | Hollander |
| 2006/0195512 A1* | 8/2006 | Rogers et al. ................. 709/203 |
| 2006/0212478 A1* | 9/2006 | Plastina ............... G11B 27/105 |
| 2006/0242106 A1* | 10/2006 | Bank ................................ 707/1 |
| 2006/0248235 A1* | 11/2006 | Eyer .................... G11B 27/322 710/1 |
| 2006/0287994 A1* | 12/2006 | George ............. G06F 17/30206 |
| 2007/0025194 A1* | 2/2007 | Morse ................. G11B 27/034 369/30.1 |
| 2007/0043765 A1* | 2/2007 | Chan ................. G06F 17/30029 |
| 2007/0118873 A1* | 5/2007 | Houh et al. .................... 725/136 |
| 2007/0174866 A1* | 7/2007 | Brown ............... H04N 7/17318 725/28 |
| 2007/0282893 A1* | 12/2007 | Smith ............... G06F 17/30058 |
| 2007/0299873 A1* | 12/2007 | Jones et al. ................. 707/104.1 |
| 2008/0074493 A1 | 3/2008 | Laughlin |
| 2008/0103906 A1 | 5/2008 | Singh |
| 2008/0114805 A1* | 5/2008 | Nord .......................... 707/104.1 |
| 2008/0178251 A1* | 7/2008 | Shin ............................. 725/141 |
| 2008/0184170 A1 | 7/2008 | Periyalwar |
| 2008/0201651 A1 | 8/2008 | Hong et al. |
| 2008/0243923 A1 | 10/2008 | Mazor et al. |
| 2008/0261516 A1* | 10/2008 | Robinson ................ G06F 15/16 455/3.06 |
| 2009/0150445 A1 | 6/2009 | Herberger et al. |
| 2009/0164034 A1 | 6/2009 | Cohen et al. |
| 2009/0164902 A1 | 6/2009 | Cohen et al. |
| 2009/0170480 A1 | 7/2009 | Lee |
| 2009/0186631 A1 | 7/2009 | Masarie, Jr. |
| 2009/0198357 A1 | 8/2009 | Logan et al. |
| 2009/0198685 A1 | 8/2009 | Bartholomew |
| 2009/0199083 A1 | 8/2009 | Sar et al. |
| 2009/0217804 A1* | 9/2009 | Lu ........................ G10H 1/0058 84/602 |
| 2009/0249387 A1 | 10/2009 | Magdy |
| 2009/0280783 A1 | 11/2009 | Klassen |
| 2009/0282020 A1* | 11/2009 | McSheffrey ........ G06F 17/3002 |
| 2009/0285444 A1 | 11/2009 | Erol |
| 2010/0009698 A1 | 1/2010 | Yang et al. |
| 2010/0061197 A1 | 3/2010 | Yoshikawa et al. |
| 2010/0106852 A1 | 4/2010 | Kindig et al. |
| 2010/0114934 A1 | 5/2010 | Martensson |
| 2010/0125571 A1 | 5/2010 | White |
| 2010/0180753 A1 | 7/2010 | Chou et al. |
| 2010/0235466 A1 | 9/2010 | Jung et al. |
| 2010/0250587 A1 | 9/2010 | Schmitz |
| 2010/0257069 A1 | 10/2010 | Levy et al. |
| 2011/0029110 A1 | 2/2011 | Hohl et al. |
| 2011/0040397 A1 | 2/2011 | Kraemer et al. |
| 2011/0061108 A1 | 3/2011 | Arrasvuori et al. |
| 2011/0072054 A1* | 3/2011 | Yoon ...................... H04H 60/33 707/802 |
| 2011/0072350 A1 | 3/2011 | Bachtiger |
| 2011/0107374 A1* | 5/2011 | Roberts ............... H04N 5/44543 725/46 |
| 2011/0173214 A1 | 7/2011 | Karim |
| 2011/0314388 A1* | 12/2011 | Wheatley ............. G11B 27/034 715/751 |
| 2012/0254223 A1 | 10/2012 | Jotanovic et al. |
| 2013/0031208 A1 | 1/2013 | Linton et al. |
| 2013/0080968 A1* | 3/2013 | Hanson ................. G06F 9/4443 715/783 |
| 2013/0205223 A1* | 8/2013 | Gilbert .................... H04L 67/02 715/748 |
| 2013/0346075 A1 | 12/2013 | Felkai et al. |

OTHER PUBLICATIONS

SpeakEasy Voice Recorder Lite by Zarboo Software, Version 2.1 updated on Feb. 17, 2010 and available on iTunes; https://itunes.apple.com/us/app/speakeasy-voice-recorder-lite/id342738702.

"The Mobile Internet: A Replacement for Radio?"—Skip Pizzi, Station Resource Group, Jun. 2010 http://www.srg.org/delivery/10-06-28%20Mobile%20Internet%20%20Broadcast%20Radio.pdf.

\* cited by examiner

AUTOMATED SYSTEM FOR COMBINING AND PUBLISHING NETWORK-BASED AUDIO PROGRAMMING

CROSS-REFERENCE TO RELATED APPLICATIONS

This application claims priority from U.S. Provisional Patent Application Ser. No. 61/471,541, filed Apr. 4, 2011 and entitled "AUDIO COMMENTING SYSTEM FOR THE INTERNET INCLUDING WEBSITES, SOCIAL NETWORKS, AND BLOGS," U.S. Provisional Patent Application Ser. No. 61/471,548, filed Apr. 4, 2011 and entitled "AUTOMATED SYSTEM FOR CREATING AND PUBLISHING INTERNET-BASED AUDIO PROGRAMMING," U.S. Provisional Patent Application Ser. No. 61/471,552, filed Apr. 4, 2011 and entitled "AUDIO RECORDING, PLAYBACK, AND PUBLISHING SYSTEM FOR CREATING VOICEOVERS, SOUNDTRACKS AND OTHER AUDIO PROGRAMMING FOR INTERNET CONTENT INCLUDING WEBSITES AND SOCIAL NETWORKS," U.S. Provisional Patent Application Ser. No. 61/582,164, filed Dec. 30, 2011 and entitled "AUTOMATIC AUDIO RECORDING AND PUBLISHING SYSTEM," and U.S. Provisional Patent Application Ser. No. 61/488,954, filed May 23, 2011 and entitled "LOCATION-BASED INTERNET RADIO PRODUCTION AND DISTRIBUTION SYSTEM," all of which are hereby incorporated herein by reference in its entirety.

FIELD OF THE INVENTION

The present invention relates to the field of Internet/network audio programming. Specifically, the present invention relates to an automated system for combining and publishing network-based audio programming.

BACKGROUND OF THE INVENTION

Creating original radio or audio-based programming such as talk shows and news for broadcast on either terrestrial or internet radio stations is a cumbersome task involving producers, editors, program directors, and hosts. There are cycles of pre-production, production, and post-production that all involve planning and execution of tasks. Even if it is one person running an Internet radio station, these tasks still need to be performed, often limiting the number of shows that can be created and audiences that any particular station can reach. As well, the resulting programs are not customizable for smaller audiences, or customizable for one particular listener's tastes.

SUMMARY OF THE INVENTION

The automated audio combining and publishing system described herein creates online audio programming based on individual sound files. In particular, the online programming is able to comprise an aggregate of individual sound files collected through the networks and/or audio recording devices. As a result, the system provides the benefit of enabling an individual to create and publish cohesive audio content comprised of a plurality of combined audio files collected from a myriad of audio data sources including audio recorded by the user of the system.

A first aspect of the application is directed to a method of combining and providing audio data to a network-accessible location for playback. The method comprises importing audio data comprising a plurality of audio files and metadata describing the audio files to an audio combining application from one or more audio sources comprising an audio recording mechanism or a memory, associating the audio files into a plurality of groups based on one or more characteristics of the audio files, transmitting the audio data to a storage database and storing the audio data on the storage database and presenting the plurality of groups to a user for selection, wherein upon selection the audio files comprising the selected group are played in a set order to the user. In some embodiments, the characteristics comprise one or more selected from the group consisting of subject, time of creation, length, format, file size, location of creation, source, author and frequency of keywords. In some embodiments, the characteristics are derived from metadata imported with the audio data and associated with one or more of the audio files. In some embodiments, the characteristics are derived from the audio files. In some embodiments, the audio data comprises a unique address where a corresponding audio file is stored, but not the corresponding audio file itself such that the unique address is associated into one or more of the plurality of groups, stored in the storage database and used to access the audio file for playback upon selection of the one or more of the plurality of groups. In some embodiments, the plurality of groups are presented for playback at a network-accessible location comprising a website, an email, a text message, a Tweet™ or a word processing program. In some embodiments, the method further comprises editing the which audio files are in each of the groups and the order each of the files are played within each of the groups. In some embodiments, the editing is performed by a user utilizing an editing feature of the audio combining application. In some embodiments, the audio files comprising the selected group are played in the set order based on one or more scripts that indicate the order which the audio files within the group are to be played when the group is selected for playback by a user. In some embodiments, the method further comprises merging the audio files in each into a single master audio file in the set order for that group such that upon selection the master audio file for the selected group is played. In some embodiments, the method further comprises transmitting one or more instruction messages to the audio sources, wherein the instruction messages describe the desired audio data to be imported. In some embodiments, the audio data further comprises video or image data.

A second aspect of the application is directed to a non-transitory computer-readable medium storing instructions that when executed by a computing device cause the computing device to perform a method comprising importing audio data comprising a plurality of audio files and metadata describing the audio files to an audio combining application from one or more audio sources comprising an audio recording mechanism or a memory, associating the audio files into a plurality of groups based on one or more characteristics of the audio files, transmitting the audio data to a storage database and storing the audio data on the storage database and presenting the plurality of groups to a user for selection, wherein upon selection the audio files comprising the selected group are played in a set order to the user. In some embodiments, the characteristics comprise one or more selected from the group consisting of subject, time of creation, length, format, file size, location of creation, source, author and frequency of keywords. In some embodiments, the characteristics are derived from metadata imported with the audio data and associated with one or more of the audio files. In some embodiments, the characteristics are derived from the audio files. In some embodiments, the audio data comprises a unique address where a corresponding audio file is stored, but not the corresponding audio file itself such that the unique address is associated into one or more of the plurality of groups, stored in the storage database and used to access the audio file for playback upon selection of the one or more of the plurality of groups. In some embodiments, the plurality of groups are presented for playback at a network-accessible location comprising a website, an email, a text message, a Tweet™ or a word processing program. In some embodiments, the method further comprises editing the which audio files are in each of the groups and the order each of the files are played within each of the groups. In some embodiments, the editing is performed by a user utilizing an editing feature of the audio combining application. In some embodiments, the audio files comprising the selected group are played in the set order based on one or more scripts that indicate the order which the audio files within the group are to be played when the group is selected for playback by a user. In some embodiments, the method further comprises merging the audio files in each into a single master audio file in the set order for that group such that upon selection the master audio file for the selected group is played. In some embodiments, the method further comprises transmitting one or more instruction messages to the audio sources, wherein the instruction messages describe the desired audio data to be imported. In some embodiments, the audio data further comprises video or image data.

Another aspect of the application is directed to a computing device for providing a media source of combined audio content. The device comprises a processor and an application executed by the processor configured to import audio data comprising a plurality of audio files and metadata describing the audio files from one or more audio sources comprising an audio recording mechanism or a memory, associate the audio files into a plurality of groups based on one or more characteristics of the audio files, transmit the audio data to a storage database and storing the audio data on the storage database and present the plurality of groups to a user for selection, wherein upon selection the audio files comprising the selected group are played in a set order to the user. In some embodiments, the characteristics comprise one or more selected from the group consisting of subject, time of creation, length, format, file size, location of creation, source, author and frequency of keywords. In some embodiments, the characteristics are derived from metadata imported with the audio data and associated with one or more of the audio files. In some embodiments, the characteristics are derived from the audio files. In some embodiments, the audio data comprises a unique address where a corresponding audio file is stored, but not the corresponding audio file itself such that the application associates the unique address into one or more of the plurality of groups, stores the unique address in the storage database and uses the unique address to access the audio file for playback upon selection of the one or more of the plurality of groups. In some embodiments, the plurality of groups are presented for playback at a network-accessible location comprising a website, an email, a text message, a Tweet™ or a word processing program. In some embodiments, the application is further configured to enable editing by a user of which audio files are in each of the groups and the order each of the files are played within each of the groups. In some embodiments, the audio files comprising the selected group are played in the set order based on one or more scripts created by the application that indicate the order which the audio files within the group are to be played when the group is selected for playback by a user. In some embodiments, the application is further configured to merge the audio files in each into a single master audio file in the set order for that group such that upon selection the master audio file for the selected group is played. In some embodiments, the application is further configured to enable transmission by a user of one or more instruction messages to the audio sources, wherein the instruction messages describe the desired audio data to be imported. In some embodiments, the audio data further comprises video or image data. In some embodiments, the storage database is integrated with the computing device. In some embodiments, one or more of the audio sources are integrated with the computing device.

Yet another aspect of the application is directed to a system for providing combined audio content. The system comprises a storage database, one or more audio sources comprising an audio recording mechanism or a memory and a computing device coupled with the storage database, wherein the computing device comprises a processor and an application executed by the processor configured to import audio data comprising a plurality of audio files and metadata describing the audio files from the one or more audio sources, associate the audio files into a plurality of groups based on one or more characteristics of the audio files, transmit the audio data to a storage database and storing the audio data on the storage database and present the plurality of groups to a user for selection, wherein upon selection the audio files comprising the selected group are played in a set order to the user. In some embodiments, the characteristics comprise one or more selected from the group consisting of subject, time of creation, length, format, file size, location of creation, source, author and frequency of keywords. In some embodiments, the characteristics are derived from metadata imported with the audio data and associated with one or more of the audio files. In some embodiments, the characteristics are derived from the audio files. In some embodiments, the audio data comprises a unique address where a corresponding audio file is stored, but not the corresponding audio file itself such that the application associates the unique address into one or more of the plurality of groups, stores the unique address in the storage database and uses the unique address to access the audio file for playback upon selection of the one or more of the plurality of groups. In some embodiments, the plurality of groups are presented for playback at a network-accessible location comprising a website, an email, a text message, a Tweet™ or a word processing program. In some embodiments, the application is further configured to enable editing by a user of which audio files are in each of the groups and the order each of the files are played within each of the groups. In some embodiments, the audio files comprising the selected group are played in the set order based on one or more scripts created by the application that indicate the order which the audio files within the group are to be played when the group is selected for playback by a user. In some embodiments, the application is further configured to merge the audio files in each into a single master audio file in the set order for that group such that upon selection the master audio file for the selected group is played. In some embodiments, the application is further configured to enable transmission by a user of one or more instruction messages to the audio sources, wherein the instruction messages describe the desired audio data to be imported. In some embodiments, the audio data further comprises video or image data. In some embodiments, the storage database is integrated with the computing device. In some embodiments, one or more of the audio sources are integrated with the computing device.

DETAILED DESCRIPTION OF THE INVENTION

An automated audio publishing system for creating and publishing network/internet-based audio programming is described herein. The automated audio publishing system provides a user an audio publishing program that enables them to create personalized audio programming, such as online radio stations, based on individual sound or other types of files. For example, the audio is able to be a "free-form" recording such that it is an idea that a person wanted to express, a review of a product, a restaurant review, a line or paragraph from a book or even an eyewitness report from a witness to an event, who wants to report on the event. As a result, the system provides the benefit of enabling individuals to create, edit and publish streams of audio content for their friends and others to listen to and enjoy.

Figure 1:
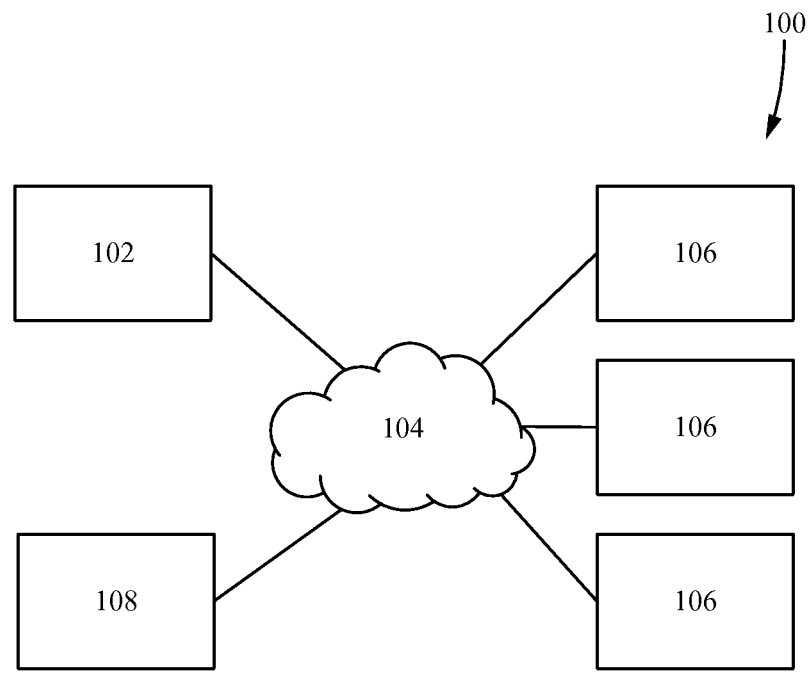
FIG. 1 illustrates an automated audio combining and publishing system according to some embodiments.

FIG. 1 illustrates an automated audio combining and publishing system 100 according to some embodiments. As shown in FIG. 1, the audio combining and publishing system 100 comprises one or more electronic devices 102 having an audio combining application, one or more audio data sources 106 and one or more storage elements/databases 108 coupled together via one or more networks 104. In some embodiments, one or more of the audio sources 106 are integrated with the electronic device 102 such that one of the networks 104 comprise an internal network. For example, the electronic device 102 is able to be a laptop computer and the audio source 106 is able to be audio files stored on the computer or files recorded by a recording mechanism on the computer. In some embodiments, one or more of the storage elements 108 are integrated with the electronic device 102. For example, one of the storage elements 108 is able to be the local memory on the electronic device. Alternatively, the storage elements 108 are able to be integrated with one or more of the audio sources 106 and/or remote storage devices separate from both the electronic device 102 and the audio sources 106. In some embodiments, the audio combining application is stored and runs locally on the electronic device 102. Alternatively, the audio combining application is able to be partially or fully stored and/or executed on a device separate from but coupled with the electronic device 102 over the network(s) 104. For example, the audio combining application is able to be stored and executed on a remote server coupled to the device 102 via the network(s) 104. In some embodiments, a user downloads the audio combining application onto the electronic device 102. Alternatively, the audio combining application is able to come pre-installed on the electronic device 102.

The electronic device 102 is able to comprise a mobile computing device such as a smart phone, computer or computing component within a vehicle. Alternatively, the electronic device 102 is able to comprise a mobile phone or other type of computing and/or networking device. In some embodiments, the one or more networks 104 comprise the internet. Alternatively, the one or more networks 104 are able to be any combination of wired and/or wireless networks such as the internet, an ethernet or other types of networks capable of transmitting audio data as are well known in the art.

The audio source(s) 106 are able to comprise one or more recording mechanisms that are able to input, record and/or store audio. In some embodiments, the recording mechanism comprises a voice recorder. Alternatively, the recording mechanism is able to be other types of audio and/or video recording devices/mechanisms as are well known in the art. In some embodiments, the recording mechanism comprises recording software stored and executed on the electronic device 102. Alternatively, the recording software is able to be partially or fully remotely executed and/or stored from the device 102. For example, the recording software is able to be remotely stored and/or executed on a website server coupled with the electronic device 102 over the network 104. In some embodiments, the audio source 106 is able to be recording mechanisms such as a recorder that captures and stores audio to hard disks of computers, mobile phones that have voice and audio recording capabilities, direct recording systems that record onto a remote Internet server, and/or any digital audio recorder that is able to be connected to a computer to transmit audio files. In some embodiments, the audio source 106 is configured such that a user is able to then utilize "copy and paste" techniques in order to insert the URL of the audio data into an email, text message or other data sharing element along with the audio signal data itself such that both the URL and the sound recording are able to be imported from the source 106. Alternatively, the source 106 is able to comprise a device that is typically used to record phone calls, where a phone number is called by the user of this system and the call center has a series of voice or keypad-activated commands to lead the caller through the process of recording.

Alternatively, the audio source 106 is able to be any network-accessible audio data such as audio data/files stored on a network-accessible memory. Alternatively, the audio source 106 is able to comprise a text-to-audio translation element such that text is able to be converted into audio and recorded as the sound recording. For example, the text to audio translation element is able to be AT&T Natural Voices™. Alternatively, the text-to-audio translation element is able to be incorporated with the audio combining application such that the audio source 106 is able to comprise sources of textual data as are well known in the art, which is able to be converted to audio by the application.

The storage elements 108 are able to comprise one or more servers. Alternatively, the storage elements 108 comprise other types of data storage/memory devices as are well known in the art. In some embodiments, the storage elements 108 comprise a master database that includes a table or list of all stored audio data and data associated with the audio data (e.g. metadata). In such embodiments, the audio data and associated data are able to be sorted as described below. For example, a user is able to access the master database table via the publishing application and filter/sort the data by one or more parameters returning a list of filtered audio and associated data. In particular, the data is able to be sorted based on the associated metadata and/or the characteristics of the audio data such as the source or person who created the data, where the data was created, when the data was created, length of the data, size of the data, format of the data, subject of the data or combinations thereof. As a result, the system 100 provides the benefit of enabling a user to utilize the audio combining application and the master database to organize, group and access all the data stored in the system 100.

In operation, a user activates the audio combining application on the electronic device 102, imports audio data to the audio combining application using an import feature of the application, and parses the imported data using the application. Alternatively, the audio combining application is remotely stored and/or executed and the user is able to user the electronic device 102 to access the application via the network 104. In some embodiments, the importing of the audio data is initiated by the audio combining application and/or its user such that the application is active and data is downloaded from the sources 106. Alternatively, the importing is able to be initiated by the sources 106 and/or their users such that the application is passive and the data is uploaded from the sources 106 to the application.

In some embodiments, the audio data is imported from within the device 102 such as from within the device memory 204 or from a recording mechanism within the device. For example, a user is able use the audio combining application to record audio data using a recording feature of the application and the recording mechanism of the device 102, wherein the recorded audio data is immediately imported to the audio combining application. Alternatively, the audio data is able to be imported from locations and/or recording mechanisms external to the device 102 via the network 104. The imported audio data is able to be imported in any data format for storing and representing audio content. In some embodiments, the audio data is imported via an download process. Alternatively, the audio is able to be imported using one or more communication methods such as emails, text messages, phone messages, or other types of communications as are well known in the art. In some embodiments, only the audio data itself or a unique address of the stored audio data is imported. Alternatively, the imported audio data is able to comprise both the audio data itself and a unique address of where the audio data is located (e.g. a universal resource locator (URL)).

In some embodiments, the audio data is able to further comprise textual data and/or visual data such as pictures or videos. For example, a photo is able to be part of the content imported by the application. In particular, a user is able to take a photo and post it on a website or find a photo already posted and then insert the URL associated with the photo into the data imported by the application for combination into the produced audio recordings. As a result, a user is able to take their own photos, post them, orally and/or textually describe the photos, and utilize the system 100 to associate this content into a single or multiple audio recording URLs.

In some embodiments, the audio combining application comprises a messaging feature that enables a user to transmit messages to other individuals. As a result, the application enables a user to instruct others to record a desired type of audio such that the user is able to import the desired audio. For example, a user or producer is able to produce an audio book, based on a written book, and so the producer is able to utilize the application to transmit messages to certain people instructing them what part of this audio book they are to record. In this manner, the imported audio data is known to be able to fit together to form the audio book. In some embodiments, the messaging feature of the application comprises text or instant messages transmitted over internet, cellular or other types of networks. Alternatively, the messaging feature is able to comprise one or more of text message, instant message, email, through a social network, by automated phone call, or other types of messaging features as are well known in the art. In some embodiments, a user is able to select on a link provided within the message that includes audio and/or video instructions in order to guide the person through the recording process. Another usage of message feature is to create recordings for birthdays, weddings, anniversaries, graduations, job promotions, and other events. In this way, a producer or message source is able to define what each person or message recipient should record (for example, tell a funny story about someone who just graduated from high school), and then alert/instruct each participant to record and submit their audio data using the messaging feature. The final combined recording of all the submitted audio data is then able to be presented to celebrate the occasion. As described below, the presentation of the final group recording is able to be on a webpage, for example an e-card or interesting graphic, which allows for selective playback of recordings (for example, it is able to mimic a gift card where multiple people sign the card, but on this graphic when a persons signature is clicked, that persons recording is played back). Alternatively, the presentation is able to be via other network accessible locations such as emails, text messages and other locations as are well known in the art.

The parsing is able to be performed by a metadata feature of the application that is able to further import or define metadata associated with the audio data during the import process for storage on the storage elements 108 with the corresponding audio signal data. In such embodiments, while the audio data is imported, any metadata or other information associated with the audio data found at the audio source 106 is able to be captured by the application. The metadata is able to comprise the size, length, format and other inherent characteristics of the audio data. Additionally, the metadata is able to comprise the title, subject, source, creation date, creation location, the introduction, summary, keywords describing the data and other characteristics of the audio data that are able to be parsed from the imported audio file or from the audio source 106. In particular, in some embodiments one or more of the audio sources 106 are able to include one or more identifiers within the imported data that indicate what other audio files it should be associated with. For example, one or more of the audio sources 106 are able to include an identifier in all audio content files related to politics or other characteristics, wherein the identifiers are able to be parsed by the audio combining application and later used to create groups/associations of audio files related to politics.

In some embodiments, all of the metadata is able to be captured automatically when an audio file is imported by parsing and otherwise processing the input audio data. Alternatively, one or more portions of metadata are able to be manually input into the application by a user via an application interface. In some embodiments, this process of manually adding metadata is able to be performed using the application via voice commands. In some embodiments, the audio combining application comprises an audio-to-text conversion element such that metadata is able to be parsed from the audio signal data itself after the data is converted to textual data. As a result, the system 100 provides the advantage of enabling the captured metadata to be stored and associated with corresponding the audio signal data such that it is able to be used to associate the audio files into groups for combined playback as described below.

After the data has been imported and parsed, the audio combining application transmits the audio data and/or metadata over the network(s) 104 to the storage elements 108 for automatic storage and formatting. In some embodiments, this storage and formatting comprises creating a new unique address indicating the location of the stored audio data (e.g. URL). Alternatively, some or all of the audio data is able to have already been stored directly on the storage elements 108 by an audio source 106 comprising a recording mechanism using streaming or online recorder technology.

The audio combining application is then able to automatically associate one or more of the stored audio files (and corresponding metadata) together in order to form one or more cohesive groups of associated audio data. Specifically, the application is able to associate all audio files stored on the storage elements 108 directed to a desired topic or having a certain characteristic based on data parsed from the imported data (e.g. metadata) and/or the audio signal data itself. For example, the groupings are able to be by subject such as audio files of talking about a political or business issue, by location such as all recordings made in Alaska, or by user identifier such as all files with a matching identifier indicating a common characteristic.

After determining one or more groups of associated audio files, the application is able to "combine" the groups for continuous playback by creating one or more programming scripts that indicate an order to play back a plurality audio files of one or more of each of the associated groups of audio data. As a result, when a user selects the group for playback, the application is able to play back the audio files in the order defined by the scripts. For example, the scripts will cause an audio/media player to first play the URL of one audio file, then the next one in the grouping, and so on, in a sequential order. Alternatively, instead of or in addition to using scripts, the audio combining application is able to combine the audio files within the group in the desired order into a single audio file. In such embodiments, the created single file is able to be selected by a user for playback, wherein the formally plurality of audio files will be played back in the desired order as the single file.

In some embodiments, the association and/or ordering of the files for playback is able to be edited by a user utilizing the audio combining application. For example, the user is able to input preset parameters into the application to configure how the associations are automatically formed by the application and whether the files are to be combined into a single file or scripts are to be used to produce the ordered playback. Additionally, for example, a user is able to access a master database via the publishing application and filter/sort the stored data by one or more parameters returning a list of audio data that is able to be associated for playback. The sorting parameters are able to comprise the audio signal data itself, the corresponding metadata and/or combinations of different types of metadata and/or the audio signal data.

The audio combining application is then able to present and/or make accessible the combined/associated audio data to one or more listeners. Specifically, in some embodiments, listeners are able to access and play the combined audio data through a playback feature/module of the audio combining application by selecting a desired associated audio content group to listen to from a list of groups on the application. In some embodiments, the playback feature enables the producer of the station to add sound effects, advertisements, and other audio content to the continuous audio stream of the grouped audio files. Specifically, the additions are able to be inserted in-between or during the individual recordings or groups that were associated by the application. For example, a short "sound brand" is able to begin a group of audio files or be placed in-between the audio files to symbolize to the listener a certain brand. In some embodiments, the user is able to "like" recordings such that other recordings that have similar metadata or other characteristics to the "liked" recording will move up in the order of recordings via changes to the script for a group. In some embodiments, the playback module is able to include the functions of fast forward or skip to next recording or next group, which enable the listener to move efficiently through the grouped audio data or groups of audio data. In some embodiments, the application comprises a behavior module that tracks the behavior of the listener such as what types of files are skipped, when are the files skipped, what characteristics do the liked or non-skipped tracks encompass. For example, based on the listener behavior the behavior module is able to determine that he listener likes short audio recordings from a particular person/recording source such that each time that person/source records something new, the recording comes to the top of the list for that person. In this way, the system 100 enables a listener is able to create a custom online radio station that corresponds to their likes.

Alternatively, the listeners are able to access and play the combined audio data by navigating to a website that contains links to and enables playback of the data. Specifically, a web page is able to be created by the application that includes the grouped audio data and has a distinct URL for sharing the groups of audio data. For example, a URL is able to be created wherein the recordings are able to play automatically when the page loads, or upon activation of a link or a "Play" button. Alternatively, access is able to be provided via download of the files (and the script) or emails, text messages and other types of message containing links to the files. As a result, the system 100 provides the advantage of enabling a user to import/submit audio data, the unique address of audio data, and/or metadata to the application, wherein the application is able to parse the submitted items from the received data and create one or more associated/combined audio recordings files for use by the user (e.g. posting on the Internet). Further, the system 100 provides the advantage of enabling the stored files to be filtered, organized or searched for using the application based on the stored corresponding metadata. Accordingly, the system 100 provides the benefit of automatically processing imported audio and corresponding data, formatting the data into an audio file accessible on the network, and combining the audio file with other files for playback as a radio station via the network.

Figure 2:
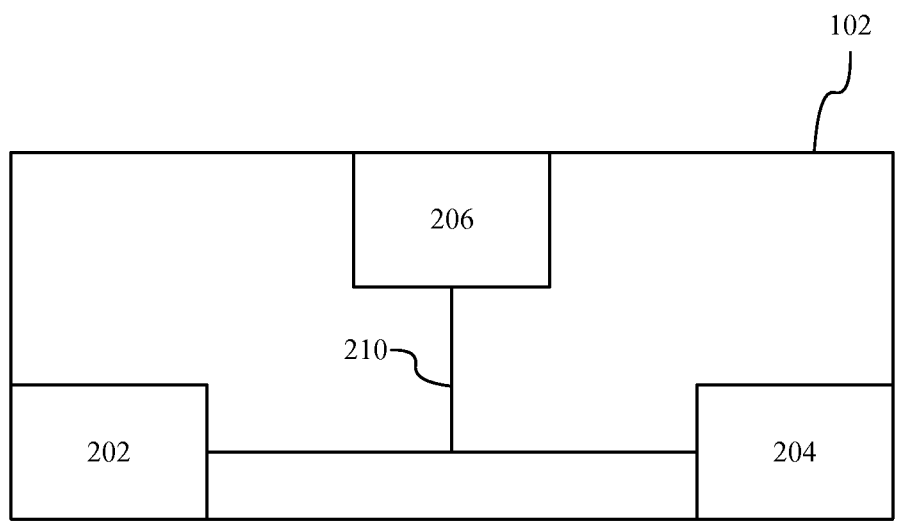
FIG. 2 illustrates an automated audio combining and publishing device according to some embodiments.

FIG. 2 illustrates the electronic device 102 according to some embodiments. As shown in FIG. 2, the electronic device 102 comprises a central processing unit (CPU) 202 for executing a audio combining application and controlling the operation of the electronic device 102, a memory 204 for storing the audio combining application, an input/output interface 206 for inputting commands from a user and outputting the audio data to the storage elements 108 via the network(s) 104 and one or more buses 210 for coupling the electronic device 102 components together. In some embodiments, the device 102 further comprises a recording mechanism that is able to comprise one of the sources 106 of the audio data. Additionally, it is understood that the electronic device 102 is able to comprise one or more additional components well known in the art, which have not been included herein for the sake of brevity.

In operation, when a user wishes to import audio, they input an activation command to the input/output interface 206 causing the CPU 202 to execute the audio combining application and then utilizing an import feature of the application to import the desired audio data. In some embodiments, the activation comprises a voice command. Alternatively, the activation comprises one or more of a voice command, the pressing of a button on the device 102 and/or other triggering actions as are well known in the art. Upon being activated, the audio combining application enables a user to begin importing, parsing, grouping and combining the audio data as described above. The device 102 is also able to transmit the audio data and metadata using the I/O interface 206 to the storage elements 108 where the data is formatted and saved. Accordingly, the grouped audio data is able to be presented as a continuous stream of a radio station for access by one or more listeners. In some embodiments, the memory 204 comprises non-volatile memory. Alternatively, the memory 204 comprises one or both of non-volatile and volatile memory. In some embodiments, the input/output interface 206 comprises a display with a graphical user interface (GUI) for receiving commands from the user. Alternatively, the input/output interface 206 comprises one or more of a display, a GUI, a voice recognition mechanism, transceiver, device physical inputs, peripherals such as mice and keyboards, and other interface components as are well known in the art.

Figure 3:
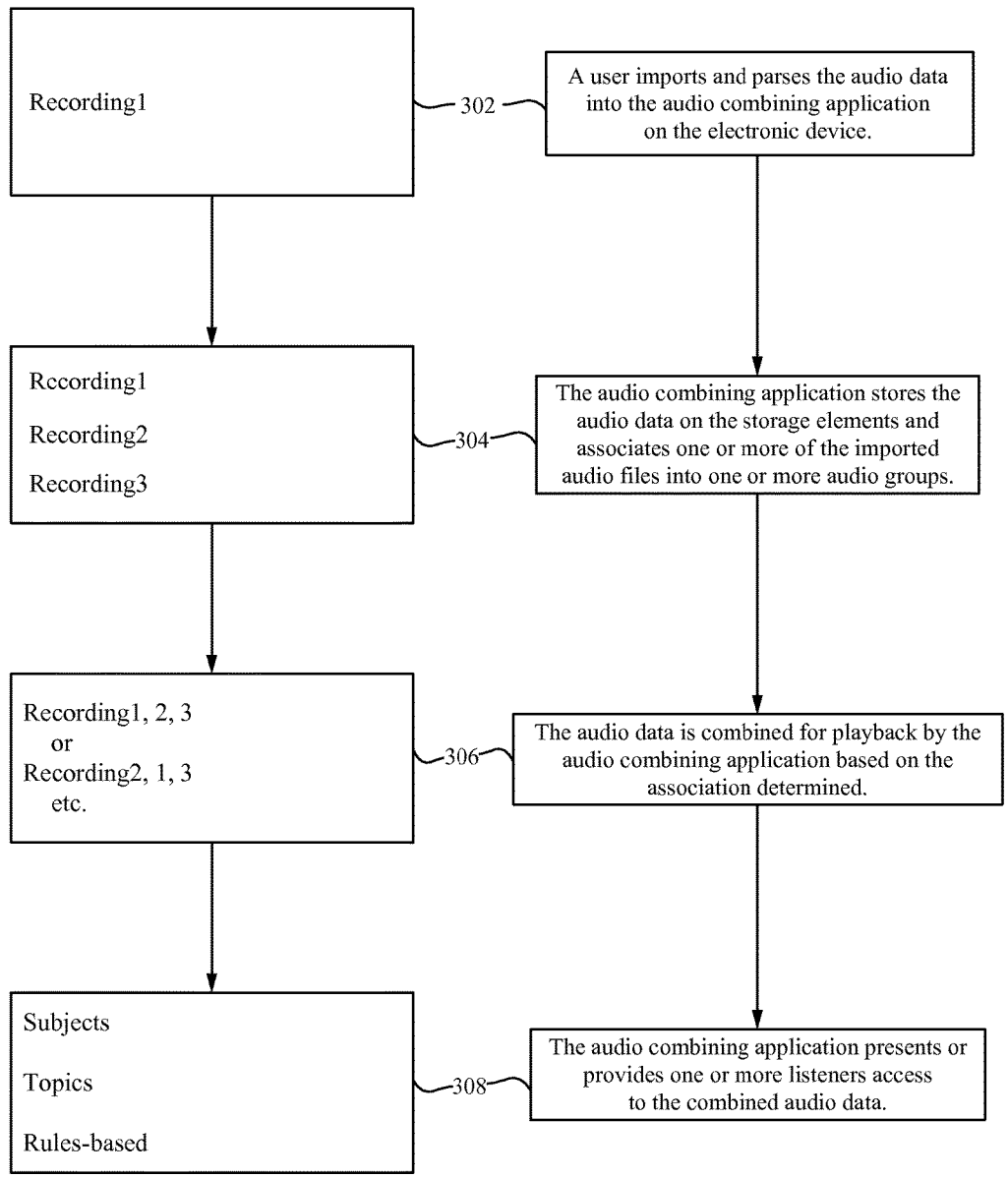
FIG. 3 illustrates a flowchart of a method of operating the audio combining and publishing system according to some embodiments.

FIG. 3 illustrates a flowchart of a method of operating the audio combining and publishing system 100 according to some embodiments. As shown in FIG. 3, a user imports and parses the audio data into the audio combining application on the electronic device 102 at the step 302. In some embodiments, the importing comprises recording audio data using a recording mechanism on the electronic device 102. Alternatively, the importing is able to comprise importing existing audio data via a graphical user interface or other types of interfaces as are well known in the art. The audio combining application stores the audio data on the storage elements 108 and associates one or more of the imported audio files into one or more audio groups at the step 304. In some embodiments, the audio data is automatically grouped without user intervention based on the characteristics of the audio files and the corresponding metadata that was parsed from the imported audio data. In some embodiments, the automatic grouping is able to be adjusted by submitting one or more grouping parameters/preferences into the audio combining application such as which characteristics should be prioritized when creating groups. Alternatively, the grouping is able to be performed manually by a user utilizing a grouping/sorting feature of the audio combining application. The audio data is combined for playback by the audio combining application based on the associations determined at the step 306. In some embodiments, the combining comprises creating one or more scripts determining the order which the associated audio files should be played back upon selection. Alternatively, the combining is able to comprise merging the associated audio files into a single file in a desired order. In some embodiments, a user is able to edit the associations and or order of the combined audio data. The audio combining application presents or provides one or more listeners access to the combined audio data at the step 308. In some embodiments, the combined audio data is presented through a playback module of the audio combining application. Alternatively, the combined audio is presented at a network accessible location such as a website.

The audio publishing system 100 described herein has numerous advantages. Specifically, the system provides the advantage of automatically processing imported audio and corresponding data, formatting the data into an audio file accessible on the network, and combining the audio file with other files for playback as a radio station via the network. Further, the system provides the advantage of a downloadable or network accessible application that enables individuals to create personalized radio stations comprises of aggregated audio files combined into a single content stream.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. In particular, it should be noted that although as described herein, the system is taught as combining sound recordings with content, the system is able to operate substantially similarly while combining images or video recordings with content. For example, a user is able to record video and audio data about content and then associate the audio and video data with the content utilizing the system. Alternatively, the user is able to utilize an A/V recorder, but only record video or only record audio for association with the target content. As a result, additional data formats for the recorded data are available including audio formats, video formats, and audio/video formats.

What is claimed is:

1. A method of combining and providing audio data to a network-accessible location for playback, the method comprising:

importing audio data comprising a plurality of audio files and metadata describing the audio files to an audio combining application from one or more audio sources comprising an audio recording mechanism or a memory;

converting the audio files to text and parsing the text to determine parsed attributes about the one or more of the audio files;

determining behavior data indicating one or more of a time and a day when the audio files are skipped by a user;

associating the audio files into a plurality of groups based on one or more characteristics of the audio files including the parsed attributes and the behavior data, wherein the associating comprises enabling a user to specify a relative priority of each of the characteristics with respect to each other and the associating is adjusted based on the relative priority of each of the characteristics;

transmitting the audio data to a storage database and storing the audio data on the storage database; and presenting one of the plurality of groups to a user via an email by simultaneously displaying a plurality of hyperlinks within the email for selection, wherein the hyperlinks are distributed within the email and each one of the hyperlinks links to a different one of the audio files of the one of the groups such that selection of one of the hyperlinks causes playback of the linked audio file.

2. The method of claim 1, wherein the characteristics comprise one or more selected from the group consisting of subject, time of creation, length, format, file size, location of creation, source, author and frequency of keywords.

3. The method of claim 2, wherein the characteristics are derived from metadata imported with the audio data and associated with one or more of the audio files.

4. The method of claim 2, wherein the characteristics are derived from the audio files.

5. The method of claim 1, wherein the audio data comprises a unique address where a corresponding audio file is stored, wherein the unique address is associated with one or more of the plurality of groups, stored in the storage database and used to access the audio file for playback upon selection of the one or more of the plurality of groups.

6. The method of claim 1, wherein the plurality of groups are presented for playback at a network-accessible location comprising a website, an email, a text message or a word processing program.

7. The method of claim 1, further comprising editing which audio files are in each of the groups and the order each of the files are played within each of the groups.

8. The method of claim 7, wherein the editing is performed by a user utilizing an editing feature of the audio combining application.

9. The method of claim 1, wherein the audio files comprising the selected group are played in the set order based on one or more scripts that indicate the order which the audio files within the group are to be played when the group is selected for playback by a user.

10. The method of claim 1, further comprising merging the audio files in each group of the plurality of groups into a single master audio file in the set order for that group such that upon selection the master audio file for the selected group is played.

11. The method of claim 1, further comprising transmitting one or more user-generated instruction messages from the audio combining application to one or more people, wherein the instruction messages are configured to be displayed to one or more of the people, and further wherein the instruction messages each include displayed text that describes desired audio data to be imported.

12. The method of claim 1, further comprising importing video or image data associated with the audio data.

13. A non-transitory computer-readable medium storing instructions that when executed by a computing device cause the computing device to perform a method comprising:
  importing audio data comprising a plurality of audio files and metadata describing the audio files to an audio combining application from one or more audio sources comprising an audio recording mechanism or a memory;
  converting the audio files to text and parsing the text to determine parsed attributes about the one or more of the audio files;
  determining behavior data indicating one or more of a time and a day when the audio files are skipped by a user;
  associating the audio files into a plurality of groups based on one or more characteristics of the audio files including the parsed attributes and the behavior data, wherein the associating comprises enabling a user to specify a relative priority of each of the characteristics with respect to each other and the associating is adjusted based on the relative priority of each of the characteristics;
  audio data to a storage database and storing the audio data on the storage database; and
  presenting one of the plurality of groups to a user via an email by simultaneously displaying a plurality of hyperlinks within the email for selection, wherein the hyperlinks are distributed within the email and each one of the hyperlinks links to a different one of the audio files of the one of the groups such that selection of one of the hyperlinks causes playback of the linked audio file.

14. The medium of claim 13, wherein the characteristics comprise one or more selected from the group consisting of subject, time of creation, length, format, file size, location of creation, source, author and frequency of keywords.

15. The medium of claim 14, wherein the characteristics are derived from metadata imported with the audio data and associated with one or more of the audio files.

16. The medium of claim 14, wherein the characteristics are derived from the audio files.

17. The medium of claim 13, wherein the audio data comprises a unique address where a corresponding audio file is stored, wherein the unique address is associated with one or more of the plurality of groups, stored in the storage database and used to access the audio file for playback upon selection of the one or more of the plurality of groups.

18. The medium of claim 13, wherein the plurality of groups are presented for playback at a network-accessible location comprising a website, an email, a text message or a word processing program.

19. The medium of claim 13, wherein the method further comprises editing which audio files are in each of the groups and the order each of the files are played within each of the groups.

20. The medium of claim 19, wherein the editing is performed by a user utilizing an editing feature of the audio combining application.

21. The medium of claim 13, wherein the audio files comprising the selected group are played in the set order based on one or more scripts that indicate the order which the audio files within the group are to be played when the group is selected for playback by a user.

22. The medium of claim 13, wherein the method further comprises merging the audio files in each group of the plurality of groups into a single master audio file in the set order for that group such that upon selection the master audio file for the selected group is played.

23. The medium of claim 13, wherein the method further comprises transmitting one or more user-generated instruction messages from the audio combining application to one or more people, wherein the instruction messages are configured to be displayed to one or more of the people, and further wherein the instruction messages each include displayed text that describes desired audio data to be imported.

24. The medium of claim 13, further comprising importing video or image data associated with the audio data.

25. A computing device for providing a media source of combined audio content comprising:
  a processor; and
  an application executed by the processor configured to:
    import audio data comprising a plurality of audio files and metadata describing the audio files from one or more audio sources comprising an audio recording mechanism or a memory;
    convert the audio files to text and parsing the text to determine parsed attributes about the one or more of the audio files;
    determine behavior data indicating one or more of a time and a day when the audio files are skipped by a user;
    associate the audio files into a plurality of groups based on one or more characteristics of the audio files including the parsed attributes and the behavior data, wherein the associating comprises enabling a user to specify a relative priority of each of the characteristics with respect to each other and the associating is adjusted based on the relative priority of each of the characteristics;

transmit the audio data to a storage database and storing the audio data on the storage database; and present one of the plurality of groups to a user via an email by simultaneously displaying a plurality of hyperlinks within the email for selection, wherein the hyperlinks are distributed within the email and each one of the hyperlinks links to a different one of the audio files of the one of the groups such that selection of one of the hyperlinks causes playback of the linked audio file.

26. The device of claim 25, wherein the characteristics comprise one or more selected from the group consisting of subject, time of creation, length, format, file size, location of creation, source, author and frequency of keywords.

27. The device of claim 26, wherein the characteristics are derived from metadata imported with the audio data and associated with one or more of the audio files.

28. The device of claim 26, wherein the characteristics are derived from the audio files.

29. The device of claim 25, wherein the audio data comprises a unique address where a corresponding audio file is stored, wherein the unique address is associated with one or more of the plurality of groups, stores the unique address in the storage database and uses the unique address to access the audio file for playback upon selection of the one or more of the plurality of groups.

30. The device of claim 25, wherein the plurality of groups are presented for playback at a network-accessible location comprising a website, an email, a text message or a word processing program.

31. The device of claim 25, wherein the application is further configured to enable editing by a user of which audio files are in each of the groups and the order each of the files are played within each of the groups.

32. The device of claim 25, wherein the audio files comprising the selected group are played in the set order based on one or more scripts created by the application that indicate the order which the audio files within the group are to be played when the group is selected for playback by a user.

33. The device of claim 25, wherein the application is further configured to merge the audio files in each group of the plurality of groups into a single master audio file in the set order for that group such that upon selection the master audio file for the selected group is played.

34. The device of claim 25, wherein the application is further configured to enable transmission by a user of one or more user-generated instruction messages from the audio combining application to one or more people, wherein the instruction messages are configured to be displayed to one or more of the people, and further wherein the instruction messages each include displayed text describes desired audio data to be imported.

35. The device of claim 25, further comprising importing video or image data associated with the audio data.

36. The device of claim 25, wherein the storage database is integrated with the computing device.

37. The device of claim 25, wherein one or more of the audio sources are integrated with the computing device.

38. A system for providing combined audio content comprising:

a storage database;

one or more audio sources comprising an audio recording mechanism or a memory; and a computing device coupled with the storage database, wherein the computing device comprises a processor and an application executed by the processor configured to:

import audio data comprising a plurality of audio files and metadata describing the audio files from the one or more audio sources;

convert the audio files to text and parsing the text to determine parsed attributes about the one or more of the audio files;

determine behavior data indicating one or more of a time and a day when the audio files are skipped by a user;

associate the audio files into a plurality of groups based on one or more characteristics of the audio files including the parsed attributes and behavior data, wherein the associating comprises enabling a user to specify a relative priority of each of the characteristics with respect to each other and the associating is adjusted based on the relative priority of each of the characteristics;

transmit the audio data to a storage database and storing the audio data on the storage database; and present one of the plurality of groups to a user via an email by simultaneously displaying a plurality of hyperlinks within the email for selection, wherein the hyperlinks are distributed within the email and each one of the hyperlinks links to a different one of the audio files of the one of the groups such that selection of one of the hyperlinks causes playback of the linked audio file.

39. The system of claim 38, wherein the characteristics comprise one or more selected from the group consisting of subject, time of creation, length, format, file size, location of creation, source, author and frequency of keywords.

40. The system of claim 39, wherein the characteristics are derived from metadata imported with the audio data and associated with one or more of the audio files.

41. The system of claim 39, wherein the characteristics are derived from the audio files.

42. The system of claim 38, wherein the audio data comprises a unique address where a corresponding audio file is stored, wherein the unique address is associated with one or more of the plurality of groups, stores the unique address in the storage database and uses the unique address to access the audio file for playback upon selection of the one or more of the plurality of groups.

43. The system of claim 38, wherein the plurality of groups are presented for playback at a network-accessible location comprising a website, an email, a text message or a word processing program.

44. The system of claim 38, wherein the application is further configured to enable editing by a user of which audio files are in each of the groups and the order each of the files are played within each of the groups.

45. The system of claim 38, wherein the audio files comprising the selected group are played in the set order based on one or more scripts created by the application that indicate the order which the audio files within the group are to be played when the group is selected for playback by a user.

46. The system of claim 38, wherein the application is further configured to merge the audio files in each group of the plurality of groups into a single master audio file in the set order for that group such that upon selection the master audio file for the selected group is played.

47. The system of claim 38, wherein the application is further configured to enable transmission by a user of one or more user-generated instruction messages from the audio combination application to one or more people, wherein the instruction messages are configured to be displayed to one or more of the people, and further wherein the instruction messages each include displayed text that describes desired audio data to be imported.

48. The system of claim 38, further comprising importing video or image data associated with the audio data.

49. The system of claim 38, wherein the storage database is integrated with the computing device.

50. The system of claim 38, wherein one or more of the audio sources are integrated with the computing device.

* * * * *